United States Patent [19]

Campbell

[11] Patent Number: 4,571,841
[45] Date of Patent: Feb. 25, 1986

[54] TOOL PRE-GAUGING DEVICE

[75] Inventor: Michael E. Campbell, Farmington Hills, Mich.

[73] Assignee: General Electric Company, Detroit, Mich.

[21] Appl. No.: 591,356

[22] Filed: Mar. 20, 1984

[51] Int. Cl.$^4$ ............................................. B27G 23/00
[52] U.S. Cl. ..................................... 33/185 R; 33/557
[58] Field of Search .......... 33/185 R, 180 R, 179.5 R, 33/174 L, 174 Q, 179.5 E, 1 M

[56] References Cited

U.S. PATENT DOCUMENTS

| | | | |
|---|---|---|---|
| 3,050,862 | 8/1962 | Koch | 33/185 R |
| 3,518,769 | 7/1970 | Bulcard, III et al. | 33/185 R |
| 3,546,781 | 12/1970 | Cox et al. | 33/185 R |
| 4,151,642 | 5/1979 | Holland et al. | 33/185 R |

Primary Examiner—Willis Little
Attorney, Agent, or Firm—Hedman, Gibson, Costigan & Hoare

[57] ABSTRACT

A system and method for pre-gauging cutting tools comprising means for releasably holding and moving a cutting tool to a gauging position or zone, and an electronic gauging means moveable to contact the cutting tool in the gauging zone for measuring and comparing offsets between a master cutting tool and other cutting tools of the same type. After the reference measurements for the master tool are made, the means for advancing the electronic gauging means can be locked in position. Means independent of the advancing mean, can thereafter retract and advance the electronic gauging means a limited distance within the gauging zone during measurements of the offsets of subsequent cutting tools.

8 Claims, 12 Drawing Figures

TOOL PRE-GAUGING DEVICE

BACKGROUND OF THE INVENTION

1. Field of the Invention

This invention relates to an apparatus for and a method of pre-gauging cutting tools.

2. Description of the Prior Art

Computer numerically controlled lathes and turning centers using conventional cutting tools have been limited by the extensive down time needed to set up each job and replace worn cutting tools. Generally, once the worn tool has been removed and a new tool has been placed in the machine, the operator must take a trial cut, stop the machine, gauge the part and adjust for tool offsets, i.e., the difference in dimensions normally present between cutting tools of the same type. The operator then must take another trial cut and determine whether he has made the proper adjustment. It is only after following this time consuming procedure can a new tool be used for cutting.

Inasmuch as cutting tools can, as a practical matter, only be made within certain tolerances, offsets between tools of the same type will always exist. There is present, therefore, a pressing need to find other ways to compensate for these offsets without causing down time at the machine.

SUMMARY OF THE INVENTION

In accordance with the invention there is provided a new and unique system which pre-gauges cutting tools of the same type in advance of their use. The offset of each cutting tool is measured and, recorded or stored ready for use when the cutting tool is placed in the machine. The operator simply adjusts the machine for the offsets of the tool and immediately commences cutting with the installed tool.

The system includes electronic gauging means which can be advanced into engagement with a cutting tool and provide a digital readout. Initially a reference or master tool is measured and the digital readout is preferably set at zero. The advancing means then can be secured at this zero point, and retracting means independent of the advancing means permit limited movement of the electronic gauging means in the gauging zone to accommodate receipt and measurement of the offsets of subsequent tools relative to the master tool.

Thus, the system of the invention easily pre-gauges the cutting tools without down time at the machine, and the system further provides accurate readings by minimizing the introduction of error due to wear of its major movable parts. In addition, scrapping of machined parts is greatly reduced because each cutting tool is properly set in the machine from the outset. Also savings in the costs of manufacture of the cutting tools themselves may be realized. Inasmuch as the present invention readily determines offsets, the dimensions of the cutting tools do not have to be quite so precise. In other words less expensive, less precise cutting tools can be used without sacrificing the precision of the machined parts.

BRIEF DESCRIPTION OF THE DRAWINGS

The following is a detailed description together with accompanying drawings of an illustrative embodiment of the invention. It is to be understood that the invention is capable of modification and variation apparent to those skilled in the art within the spirit and scope of the invention.

DETAILED DESCRIPTION OF THE INVENTION

Figure 1:
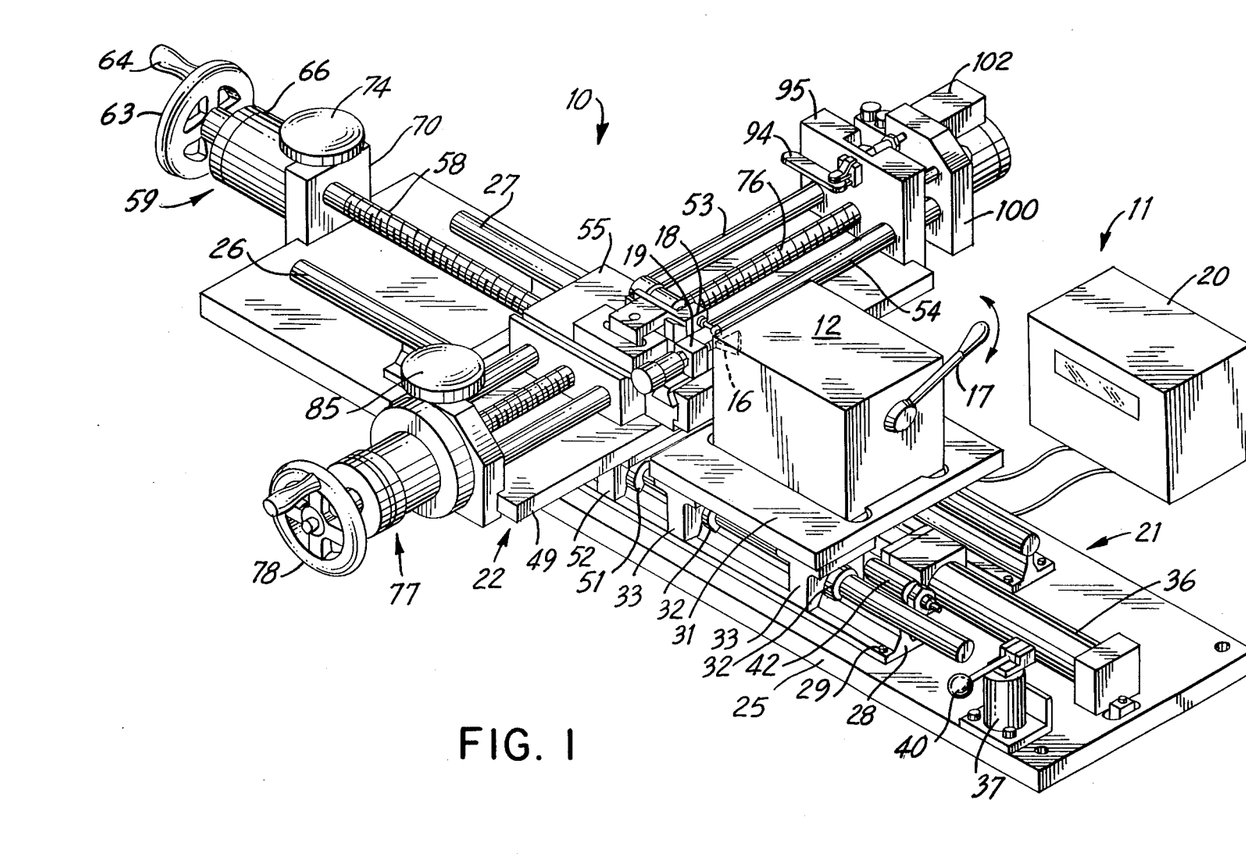
FIG. 1 is a perspective view of the tool pre-gauging system of the invention.
Figures 2, 2A:
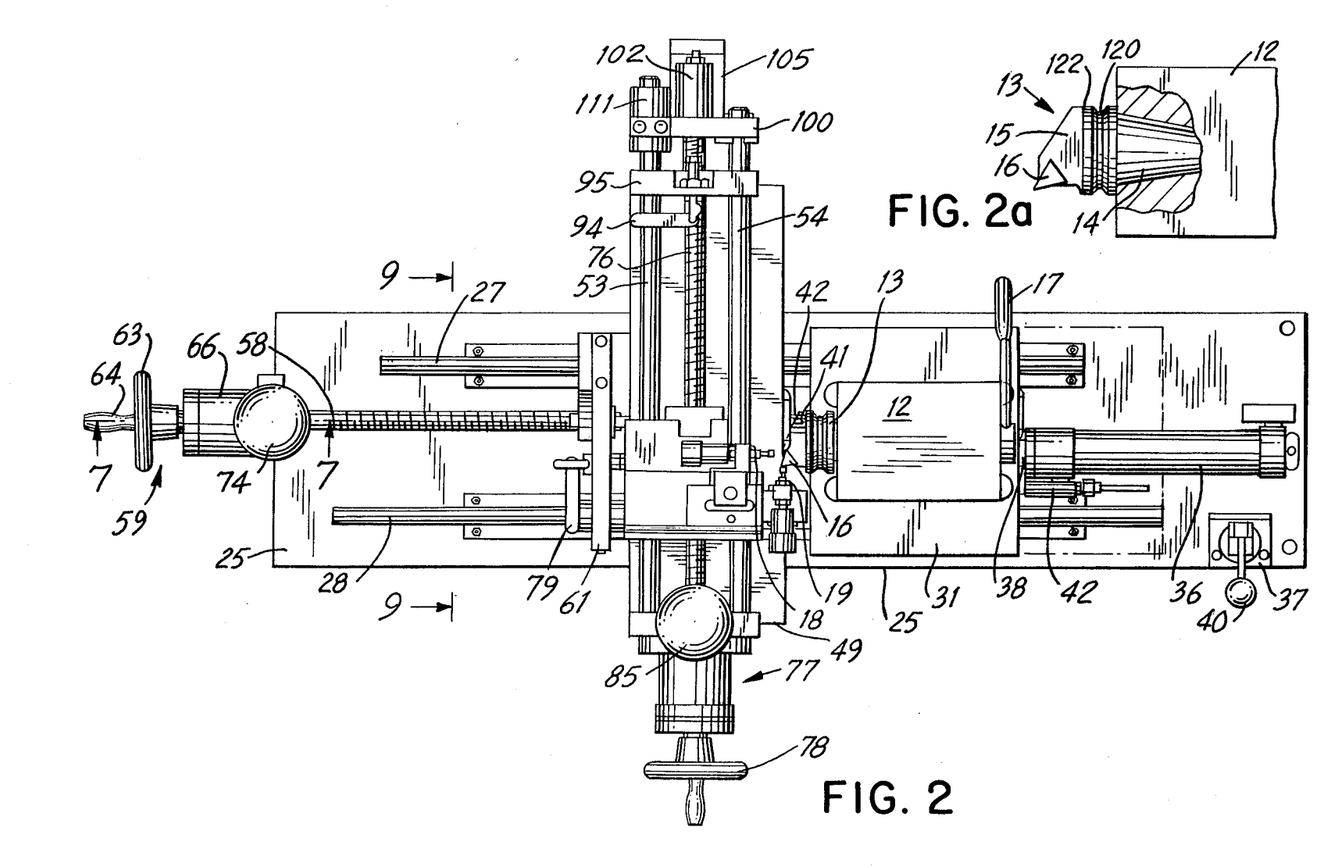
FIG. 2 is a plan view of the tool pre-gauging system of the invention.
FIG. 2a is a plan view, partly in section, illustrating the insertion of a cutting tool to be gauged in a tool holding device for the system of the invention.

Referring to the drawings, and particularly to FIG. 1 and 2, there is shown a preferred embodiment of the system 10 including an electronic measuring device 11 for pre-gauging cutting tools 13 held in a tool holding device, such as the clamping block 12.

Preferably the tool holding device 12 is identical to the one used at the machine work station to provide high location accuracy and repeatability. In the illustrative embodiment, the clamping block 12 is the same as the clamping block disclosed in U.S. patent application, Ser. No. 481,548, now U.S. Pat. No. 4,499,800, filed Apr. 4, 1983 by Gunther R. Stahl, and assigned to the assignee of the present invention, the entire disclosure of which is hereby incorporated by reference. In general, rotation of the arm 17 in a clockwise direction locks a cutting tool 13 in the block 12 and rotation of the arm in a counter clockwise direction unlocks and allows removal of the tool 13.

The system 10 of the invention can be used to preguage a wide variety of standard and special cutting tools. As shown in FIG. 2a the cutting tool 13 includes a tapered shank 14 held by the block 12 and a head 15 which extends from the block 12 and holds the cutting insert 16. Normally these components of the cutting tool 16 are manufactured within certain tolerances. Accordingly, tools of the same type generally have slightly different dimension. Typically, the same cutting tools can differ from one another by about 0.010 to about 0.020 inches. These differences result in offsets which are pre-gauged by the present invention.

The electronic gauging device 11 of the invention preferably includes a pair of means in the form of probes 18 and 19 connected to a digital display 20. In the illustrative embodiment the electronic gauging device 11 is a commercially available unit sold by Day Tronics under the designation Trans-Tek No. 351-000. The electronic gauging device 11 initially measures a master tool to determine reference measurements, and these measurements are digitally displayed and then preferably set at zero. Thereafter, cutting tools 13 of the same type are measured by the electronic gauging device 11 to determine their offsets from the master tool 13. To make these measurements the block 12 is moved to a gauging position or zone by a pneumatically operated mechanism 21 and the probes 18 and 19 of the device are moved to the gauging zone by a carriage device 22.

With this invention a number of tools can be pre-gauged with their offsets recorded or stored for future recall when the tool is about to be used at the work station.

By simply reading the offset the operator can immediately adjust the machine. Aternatively the controls of the machine may read the offset and automatically set the machine. In either event the machine is set immediately without having to make time consuming trial cuts. A bar coding and reading system which can be used to record and display the offsets is disclosed in U.S. patent application Ser. No. 591,355, of Michael E. Campbell, filed contemporaneously herewith and assigned to the same assignee of the present invention, the entire application of which is hereby incorporated by reference.

More particularly, the mechanism 21 for moving the block 12 includes a slidable platform 31 on which the block 12 is mounted. The platform 31 is slidably mounted on a pair of spaced parallel rails 26 and 27 by bushings 32 and housing 33. In turn, the rails 26 and 27 are mounted on a base 25 of the system 10 by legs 28 and screws 29. The block 12 and the platform 31 are moved along the rails 26 and 27 by a reciprocating rod 38 extending from a pneumatic cylinder 36. The cylinder 36 and rod 38 are positioned between the rails 26 and 27 with the cylinder 38 mounted on the base 25 and the rod 38 secured to the underside of the platform 31 as shown in phanthom in FIG. 10. Stop buttons 41 on the base 25 and stop buttons 42 on the platform 31 limit the movement of the block 12 on the rails 26 and 27 between the gauging position shown in FIG. 1 and the unload-load position shown in phanthom in FIG. 2.

Figure 10:
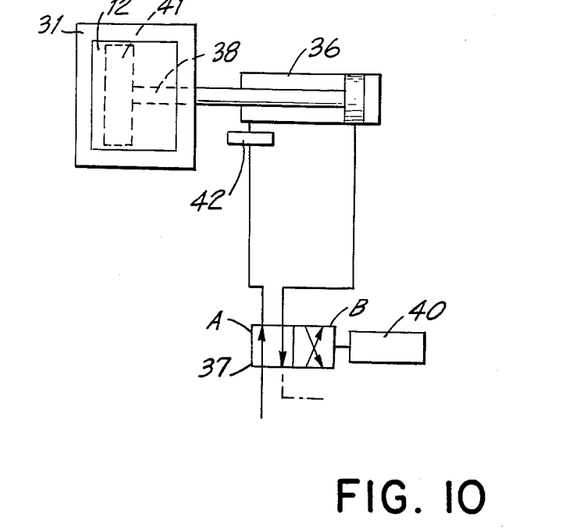
FIG. 10 is a schematic drawing of the pneumatic circuit for moving the tool holding block.

The reciprocation of the rod 38 is pneumatically controlled by a valve 37 and a handle 40 mounted on one side of the base 25 rearwardly of the retracted block 12. In FIG. 10 the circuit for reciprocating the rod 38 is schematically shown. The rod 38 is secured to a piston 43 which slidably moves within the cylinder 38. When the valve handle 40 is moved to position A air under pressure is delivered to the downstream side of the piston 36 and air is exhausted from the upstream side thereof. In such event the rod 38 is moved rearwardly retracting the platform 31 and the block 12 until the rearward buttons 41 and 42 engage. The block 12 now is ready for unloading of a gauged cutting tool 13 and loading of a cutting tool to be gauged. Correspondingly, when the valve handle 40 is moved to position B the sequence is reversed, causing the rod 38 to move the platform 31 and the block 12 to their advanced gauging position. In this position the forward buttons 41 and 42 engage and limit the advance of the block 12, and the cutting tool 13 is ready for gauging. As shown in FIG. 2a the head 15 and cutting insert 16 extend from the block 12 in the horizontal plane.

In a preferred embodiment the pre-gauging system 10 measures the tool offsets in two axes, the x and y axes which are in the horizontal plane and perpendicular to each other. The rails 26 and 27 extend along the x axis. The carriage device 22 is slidably mounted on rails 26 and 27 and extends along the y axis. The carriage device 22 has a base 49 slidably mounted to rails 26 and 27 by bushings 51 and bushing housings 52. The probes 18 and 19 of the device 11 are mounted on carriage 22 such that probe 18 measures in the x axis and probe 19 measures in the y axis.

A pair of second rails 53, 54 are mounted to carriage 22, and a platform 55 is slidably mounted on the rails 53, 54 by the same method used to mount the tool holder platform 31 on the base 25. The probes 18 and 19 are clamped to the platform 55 by clamps 56 and 57 (FIG. 3), such that the probe 18 is oriented to face the cutting tool in the x axis and the probe 19 is oriented to face the cutting tool in the y axis.

Figure 9:
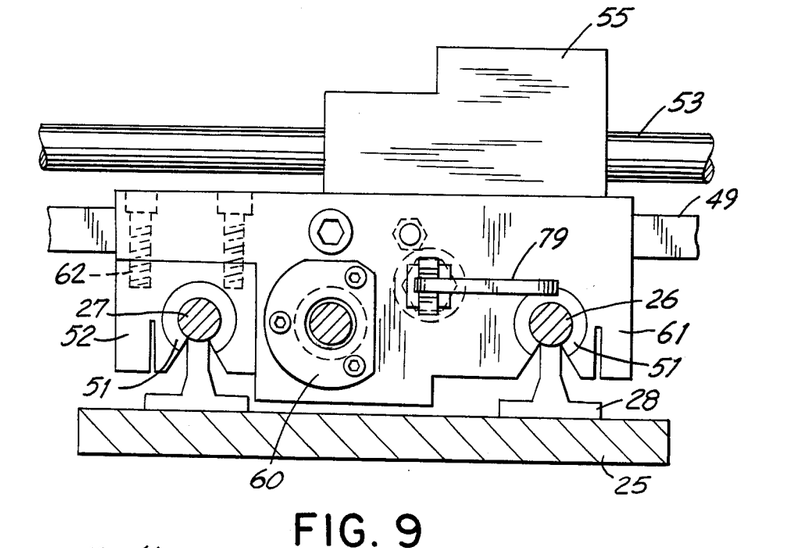
FIG. 9 is a sectional taken along line 9—9 of FIG. 2.

The pre-gauging system 10 is initially calibrated for a master tool. The probe 18 is advanced by drive means 59 to contact cutting insert 16 of the tool 13 in order to calibrate the device for the x axis. The drive means 59 includes a lead screw 58 threaded into a drive nut 60 which is secured to an x axis positioner 61. The positioner 61 is slidable on rails 26 and 27. As shown in FIG. 9 rails 26 and 27 extend through bushings 51. For rail 27 there also is provided a housing 52 secured to the positioner 61 by screws 62. The x axis positioner 61 is connected to the carriage 22 by suitable means which will be detailed later. Rotation of the lead screw 58 will advance or retract the positioner 61 and the carriage 22 along the x axis.

Figure 7:
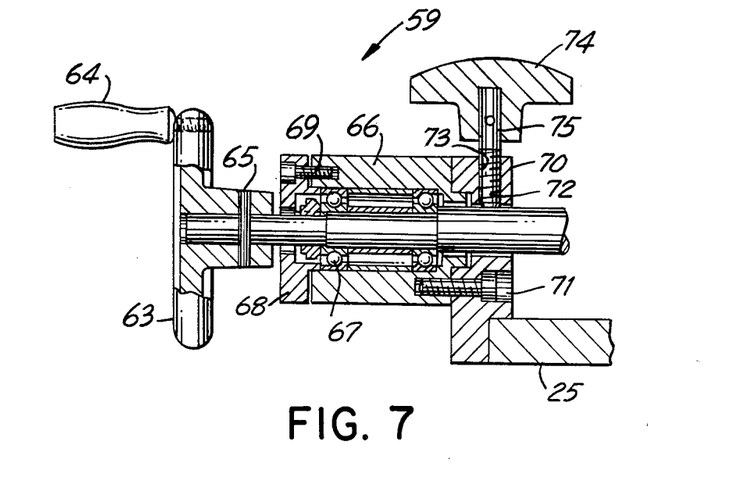
FIG. 7 is a side elevational view of the hand wheel mechanism for moving electronic gauging means of the system.
Figure 8:
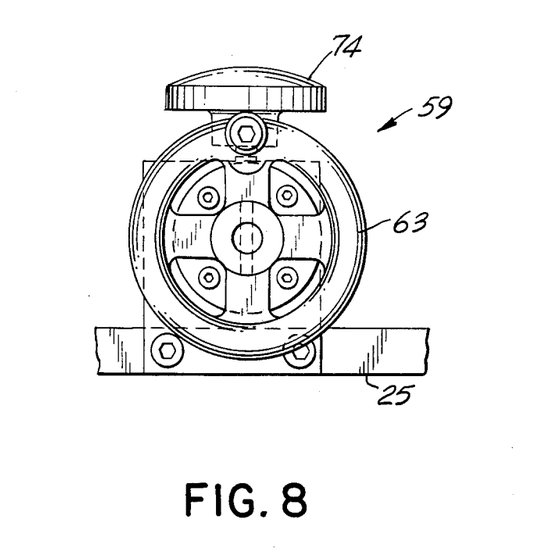
FIG. 8 is an end view of the hand wheel mechanism of FIG. 7.

As shown in FIGS. 7 and 8, the drive means 59 includes a handwheel 63 having a revolving handle 64. The handwheel 63 is connected to the lead screw 58 by any suitable means such as a nut and washer extending through the end of lead screw 58 or a roll pin 65 as shown in FIGS. 7 and 8. A bearing housing 66 contains bearing retainer 68 secured to one end by screws 69. Bracket 70 secured to the opposite end of bearing housing 66 by screws 71 has a lock stud 72 extending through threaded bore 73. The lock stud 72 extends up through hand knob 74 and is retained therein by roll pin 75. Tightening down on hand knob 74 causes lock stud 72 to contact the threads on lead screw 58 and lock the lead screw 58 in position.

As the handwheel 63 is rotated in a clockwise direction, the lead screw 58 rotates and advances the carriage 22 along the x axis to a point where the probe 18 contacts tool cutting insert 16. This produces a reading on display 20. The master tool is then calibrated by further advancing probe 18 to obtain a set reference reading, usually zero. Once the zero reading is obtained, the carriage 22 is locked in position by engaging the lead screw 58 by the lock stud 72. While it is preferred to lock the lead screw 58 in position, it is to be understood the carriage 22 can be retracted by rotating the handwheel 63 in a counter clockwise direction.

The pre-gauging system 10 is calibrated for the y axis in the same manner as explained for the x axis. Lead screw 76 is mounted between rails 53 and 54 and is connected to Y axis drive means 77 and the platform 55. The drive means 77 is identical to drive means 59 wherein a clockwise rotation of the handwheel 78 permits probe 19 to advance and contact the cutting tool insert 16 along the y axis. The probe 19 is advanced until the digital readout on display 20 is zero and hand knob 85 locks lead screw 76 into position.

The calibrating of each axis must be performed separately since only one readout can be displayed at a time. Each probe, therefore must be retracted to allow the other probe to be advanced. At the same time the calibration of the lead screws must be maintained. In addition, the calibration of both axes must be maintained while a gauged master tool is removed and the cutting tools of the same type are gauged.

Toggle mechanisms 79 and 94 provide for the requisite retraction of the probes 18 and 19 in the x and y axes independently of their respective drive means 59 and 77.

Figure 3:
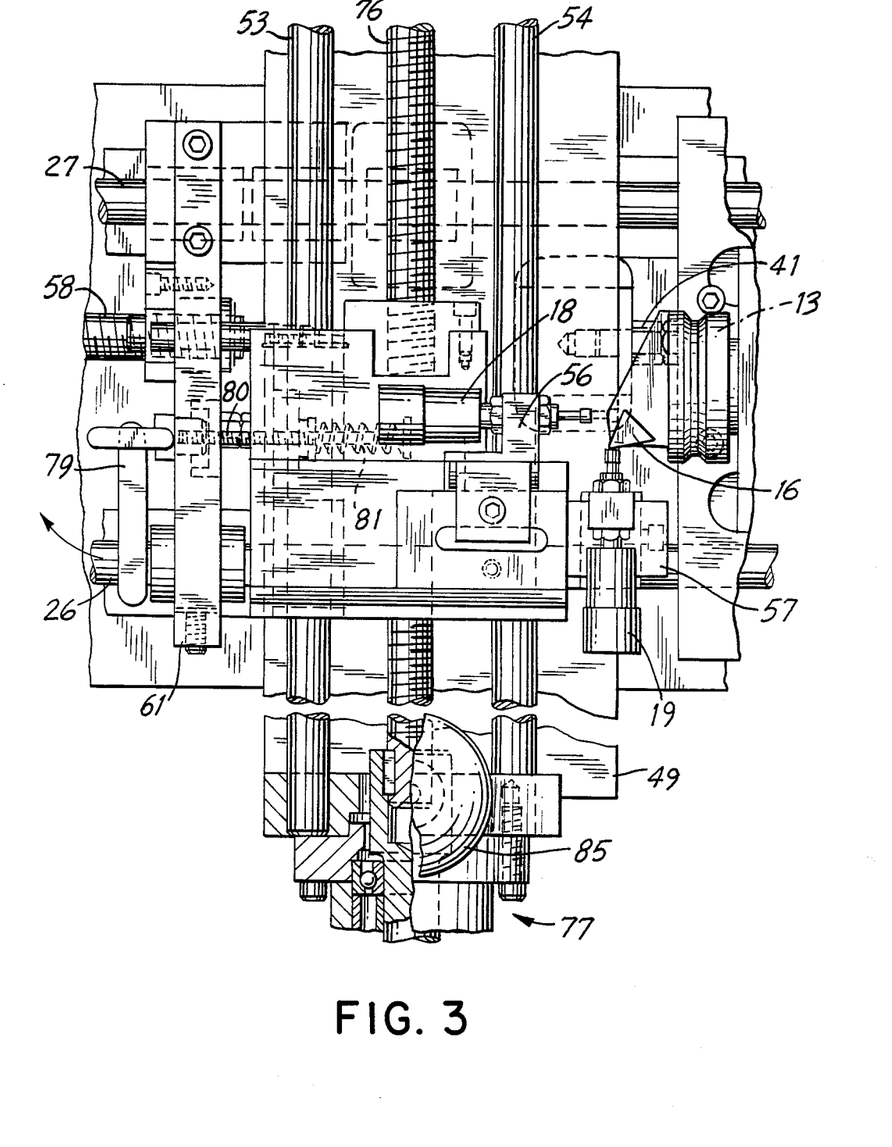
FIG. 3 is an enlarged plan view of the gauging zone of the system of FIG. 2.
Figure 4:
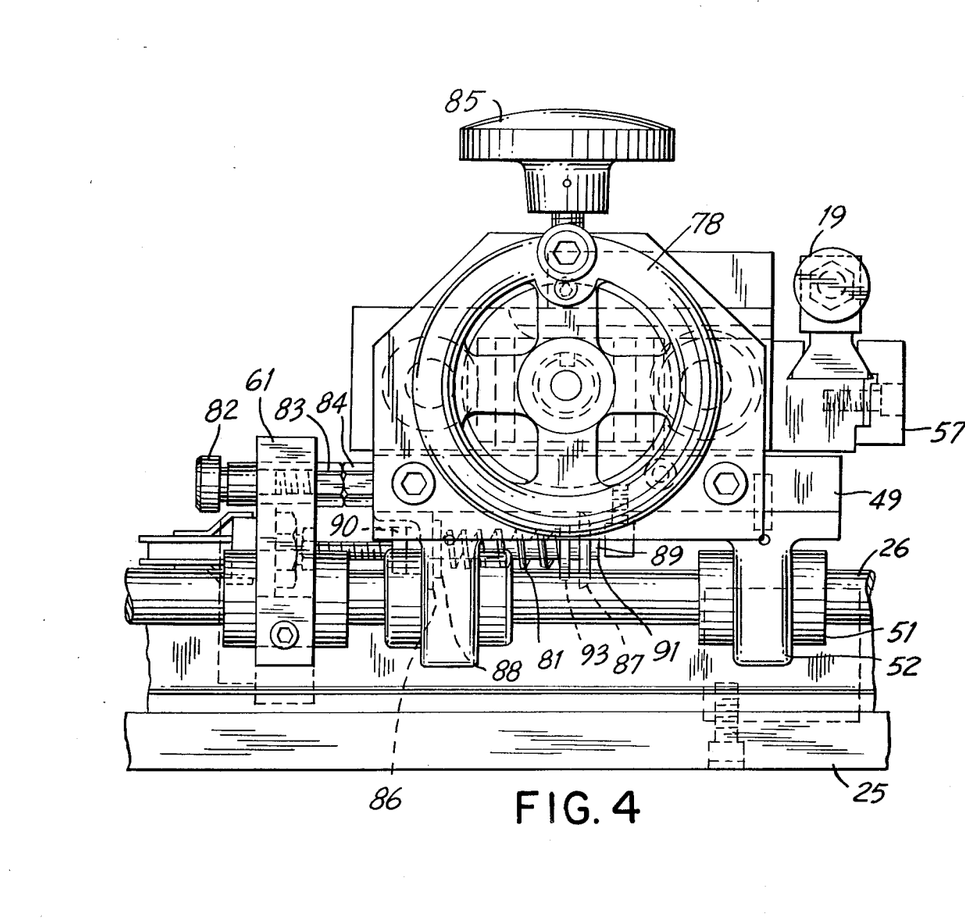
FIG. 4 is a side elevational view of the gauging zone of FIG. 3.

The toggle mechanism 79 for the x axis is mounted to the x axis positioner 61. A drawbar 80 is connected between x axis positioner 61 and a spring 81 which is mounted to carriage 22 by brackets 86 and 87 (FIGS. 3 and 4). A shoulder screw 82 is extended through x axis positioner 61 and into the carriage 22.

As shown in FIG. 2 and 3 the toggle 79 is in the retract position. When the toggle 79 is rotated 90 degrees to the advance position the drawbar 80 is extended, compressing spring 81 away from toggle 79 and correspondingly moving carriage 22. Brackets 86 and 87 have apertures 88 and 89. Nuts 90 and 91, smaller in diameter than apertures 88 and 89, and washers 92 and 93, larger in diameter then apertures 88 and 89, are attached to the drawbar 80. When the drawbar 80 is extended, nuts 90, 91 pass through the aperture 88 and the washer 93 is pressed against the bracket 87, thereby compressing the spring 81. The shoulder screw 82 also advances and the movement of the carriage 22 is halted when the head of shoulder screw 82 contacts the x axis positioner 61. The rest buttons 83 and 84 will correspondingly separate. When the toggle 79 is returned to the retract position the spring 81 is compressed in the opposite direction by the movement of the drawbar 80 towards the toggle 79 and the pressing of the washer 92 against the bracket 86. The movement in this direction is halted by the contact between the rest buttons 83 and 84.

Thus, the amount of retracting movement is defined by the spacing between the rest buttons 83 and 84. The spacing is the same spacing between the head of the shoulder screw 82 and the x axis positioner 61, to insure that the probe 18 is returned to the calibrated measuring position. A spacing of one-half inch has been found to be satisfactory.

The toggle mechanism 94 for the y axis, includes a toggle 94 mounted to slide bracket 95. The slide bracket 95 is connected to the rails 53, 54 by set screws 96, 97 respectively. The slide bracket 95 is also secured to the carriage 22 by the rest button 98. A drawbar 99 is connected to the slide bracket 95, passes through the lead screw slide 100 and is connected to a spring 101. The spring 101 is contained in a spring retainer 102 and is alternately compressed against washers 103 and 104 depending on the movement of toggle 94. The lead screw 76 extends through the slide bracket 95 and the lead screw slide 100 and is secured to a bearing housing 105. The bearing nut 106 is threaded onto the lead screw 76 and buts against the bearing 107. The bearing 107 is provided to further support the lead screw 76. The bearing housing 105 is secured to the slide 100 and the bearing retainer 108 by screws 109 and 110, respectively. The bearing holder 111 is secured to the slide 100 by screws 112 and contains bearings 113 to permit movement of the slide 100 along rail 53. The bearing 114 is provided for the same purpose along rail 54. The shoulder screw 115 passes through the slide 100 and is connected to the slide bracket 95 to define the movement of the slide 100 in one direction. The rest button 116, attached to the slide 100 will butt against the rest button 98 to define movement of the slide 100 in the opposite direction.

Figure 5:
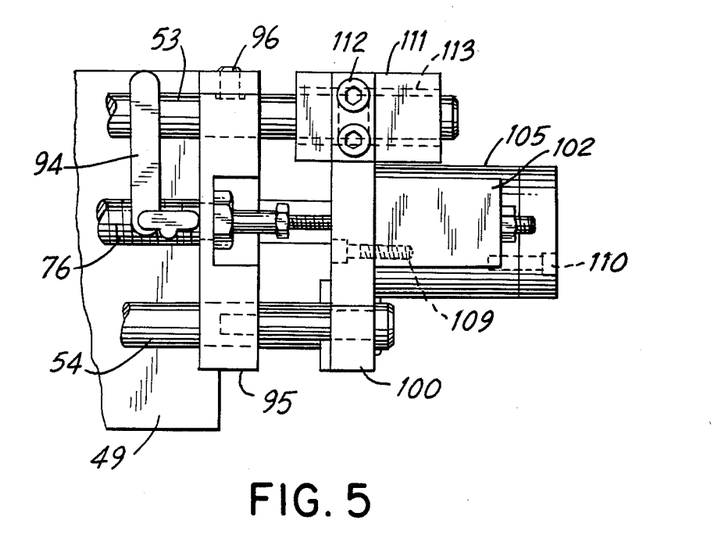
FIG. 5 is a plan view of a preferred embodiment of the advancing and retracting device for the block which holds the cutting tool.
Figure 6:
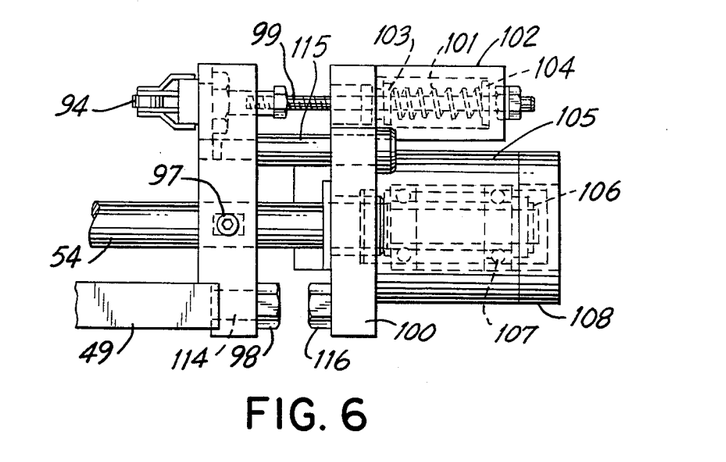
FIG. 6 is a side elevational view of the advancing and retracting device of FIG. 5.

The toggle 94 as shown in FIGS. 5 and 6 is in the gauging or measuring position. When the toggle 94 is rotated ninety degrees, the drawbar is retracted toward the slide bracket 95 compressing the spring 101 in the same direction. This causes the slide 100 and the lead screw 76 to move to close the gap shown between the rest buttons 98 and 116. The platform 55 being connected to the lead screw 76 will be correspondingly moved thereby retracting the probe 19 away from the measuring position. A return of the toggle 94 to the measuring position will extend the drawbar 99 until the slide bracket 100 contacts the shoulder screw 115 thereby advancing the probe 19 into the measuring position.

As described earlier, the pre-gauging system 10 can be used to pre-gauge a variety of cutting tools. For example, both left and right hand cutting tools can be measured in the present pre-gauging invention. The system as shown is gauging a left hand tool. To gauge a right hand tool the probe 19 will be mounted in the opposite side of the cutting tool and the toggle mechanism 94 will be rotated 180° from the position shown. For right hand tools, the toggle mechanism 94 operates the same way except that the retract and advance positions of the toggle 94 will be opposite of that with the left hand tools. In each of the illustrative embodiments, moreover, the cutting tools presented for measurement are positioned in the horizontal plane.

Further, both toggle mechanisms 79 and 94 operate independently of the lead screw calibrations. Once calibrated, the measuring probes 18 and 19 are retracted and advanced only by the toggle mechanisms. The toggle mechanisms 79 and 94 provide fixed motion positive stop probe positioning that permits repeatability of gauging. Once the pre-gauging system 10 is calibrated to a master tool by obtaining the zero reference readings, the system 10 is ready to measure the offsets of cutting tools of the same type. To accomplish this, the calibrated toggles 79 and 94 are retracted and the tool clamping block 12 is withdrawn to the load-unload position. A cutting tool 13 to be measured or gauged against the master tool is inserted in the block 12 and advanced to the measuring position or zone. The x axis toggle 79 is actuated advancing the probe 18 into contact with the cutting tool insert 16. The deviation from the master tool will appear on the digital display 20 and can be recorded by the operator or automatically. The toggle 79 is returned to the retract position and the operation is repeated with the y axis toggle 94. The y axis deviation also is recorded. The tool offset information can be stored in a tool identification system for use or recall when the tool is used for machining. One such system is the bar coding system described in the earlier identified United States Application, being filed simultaneously herewith and schematically shown in FIG. 11 hereof.

Figure 11:
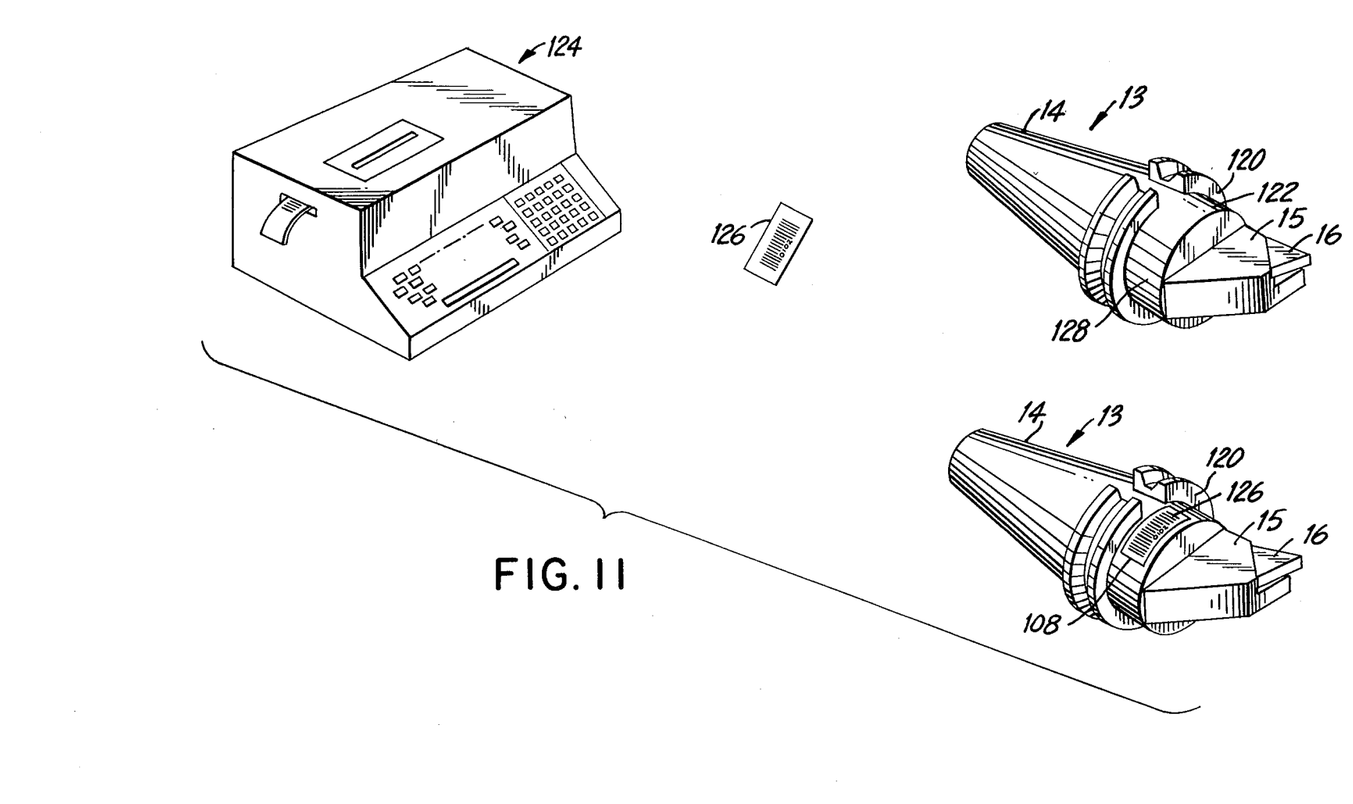
FIG. 11 is a schematic drawing of a bar coding system for indexing the pregauged cutting tools.

As shown in FIG. 11 the cutting tool 13 has a V-shaped flanged groove 120 and an annular shoulder 122 between the shank 14 and the head 15. The system includes a bar coder 124 which prints bar coded labels or strips 126 containing the desired information about the cutting tool 13, including the type of tool and its offset from the master tool. In the illustrative embodiment the label 126 is applied to the upper face 128 of the shoulder 122 to facilitate reading by a bar code reader or by the controls of the machine tool (not shown). An example of a bar coder which can be used with the present invention is Model No. MS 132 sold by Metrologic Instruments, Inc. of Bellmawr, N.J.

Thus, the system of the invention easily and accurately pre-gauges cutting tools, reduces the scrapping of machine parts, allows for the use of less expensive, less precise cutting tools, and can be readily integrated with bar coding and reading devices and other systems which automate the handling and use of cutting tools.

While a preferred embodiment of the subject invention has been described and illustrated, it is obvious that various changes and modifications can be made therein without departing from the spirit of the present invention which should be limited only by the scope of the appended claims.

What is claimed is:

1. A system for pregauging cutting tools to ascertain their offsets relative to a master cutting tool comprising:
   a pair of spaced parallel rails mounted on a base;
   a platform slidably mounted on said pair of spaced parallel rails;
   means for releasably holding a cutting tool to be gauged, said means being mounted on said platform;
   means for advancing and retracting said platform with said holding means from a position for loading and unloading the cutting tool to and from a position for gauging the cutting tool;
   electronic gauging means for taking a measurement of a cutting tool along two axes which are perpendicular to each other and for providing a digital readout of the measurements for each axis;
   means for advancing said electronic gauging means to contact a master cutting tool in the gauging position to provide reference measurements and for locking said advancing means after such measurements have been made; and
   means for retracting said electronic gauging means a limited distance and independent of said electronic gauging advancing means after measurements of the master tool and for advancing said electronic gauging means for measuring offsets of a cutting tool in the gauging position relative to the measurements of the master tool.

2. The pre-gauging system of claim 1, wherein said means for advancing and retracting said cutting tool holding means comprises a pneumatically operated piston connected to said platform for the advancement and retraction thereof along said rails.

3. The pre-gauging system of claim 2, comprising a carriage means which is slidably mounted on a first pair of spaced parallel rails and a second pair of spaced parallel rails mounted on said carriage means on which said electronic gauging means are slidably mounted.

4. The pre-gauging system of claim 3, said means for advancing the electronic gauging means to contact the master tool comprises a first lead screw extending along a first axis and connected to said carriage means, and a drive means connected to said lead screw for moving said carriage means along the first axis.

5. The pre-gauging system of claim 4, wherein said means for advancing said electronic gauging means to contact the master tool comprises a second lead screw mounted on said carriage means along a second axis and connected to said electronic gauging means, and drive means connected to said second lead screw for moving said electronic gauging means along the second axis.

6. The pre-gauging system of claim 5, wherein said means for moving said electronic gauging means a limited distance comprises a first and second toggle mechanism.

7. The pre-gauging system of claim 6, wherein said first toggle mechanism comprises a spring attached to said carriage means, a toggle clamp spaced a limited distance from said carriage means and a drawbar connected between said toggle clamp and said spring.

8. The pre-gauge system of claim 7, wherein said second toggle mechanism comprises a spring attached to said second lead screw, a toggle clamp spaced a limited distance from said spring, and a drawbar connected between said toggle clamp and said spring.

* * * * *